US012051839B2

(12) United States Patent
Jian et al.

(10) Patent No.: US 12,051,839 B2
(45) Date of Patent: Jul. 30, 2024

(54) MINIATURE FILTER DESIGN FOR ANTENNA SYSTEMS

(71) Applicant: TELEFONAKTIEBOLAGET LM ERICSSON (PUBL), Stockholm (SE)

(72) Inventors: Chunyun Jian, Ottawa (CA); Mi Zhou, Nepean (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 558 days.

(21) Appl. No.: 17/422,782

(22) PCT Filed: Jan. 15, 2020

(86) PCT No.: PCT/IB2020/050317
§ 371 (c)(1),
(2) Date: Jul. 14, 2021

(87) PCT Pub. No.: WO2020/148683
PCT Pub. Date: Jul. 23, 2020

(65) Prior Publication Data

US 2022/0077553 A1 Mar. 10, 2022

Related U.S. Application Data

(60) Provisional application No. 62/792,657, filed on Jan. 15, 2019.

(51) Int. Cl.
*H01P 1/20* (2006.01)
*H01P 7/08* (2006.01)
*H01Q 1/50* (2006.01)

(52) U.S. Cl.
CPC .................. *H01P 1/20* (2013.01); *H01P 7/08* (2013.01); *H01Q 1/50* (2013.01)

(58) Field of Classification Search
CPC .......... H01P 1/20; H01P 7/08; H01P 1/20345; H01Q 1/50
See application file for complete search history.

(56) References Cited

U.S. PATENT DOCUMENTS 7,321,284 B2 * 1/2008 Chen ...................... H01P 1/203
336/200
2011/0237216 A1 9/2011 Yoshikawa
(Continued)

OTHER PUBLICATIONS

Kalialikis, Christos, International Search Report, PCT/IB2020/050317, EPO, The Netherlands, dated Mar. 13, 2020.
(Continued)

*Primary Examiner* — Minh D A
(74) *Attorney, Agent, or Firm* — Ericsson Canada Inc.

(57) ABSTRACT

A filter and array of filters providing inductive coupling are disclosed. According to one aspect, an RF filter includes a plurality of dielectric layers with a first ground plane on one side of the dielectric layers and a second ground plane on an opposite side of the dielectric layers. One of the first and second ground planes provides an input port and one of the first and second ground planes provides an output port. Two parallel strip line resonators, lie in a first plane parallel to, and between, the first and second ground planes, the two parallel strip line resonators, having a gap there between. An inductive coupling plate in proximity to the gap, is grounded at an edge and lies in a second plane, the second plane parallel to the first plane and lying between the first plane and one of the first and second ground planes.

12 Claims, 11 Drawing Sheets

(a) Bottom (B-B' plane) view (b) Side (A-A' plane) view (c) Circuit model

Bottom view and side view of two quarter-wave resonators coupled by a grounded coupling plate, and its circuit model.

(56) References Cited

U.S. PATENT DOCUMENTS

| | | | | |
|---|---|---|---|---|
| 2012/0092090 | A1 | 4/2012 | Ahn | |
| 2017/0069943 | A1 | 3/2017 | Chayat | |
| 2017/0271732 | A1* | 9/2017 | Rossiter | H01P 3/08 |
| 2017/0294717 | A1* | 10/2017 | Zhang | H01Q 9/0478 |

OTHER PUBLICATIONS

Kalialakis, Christos, "International Search Report" of International application No. PCT/IB2020/050317; EPO, The Netherlands, dated Mar. 23, 2020.

* cited by examiner

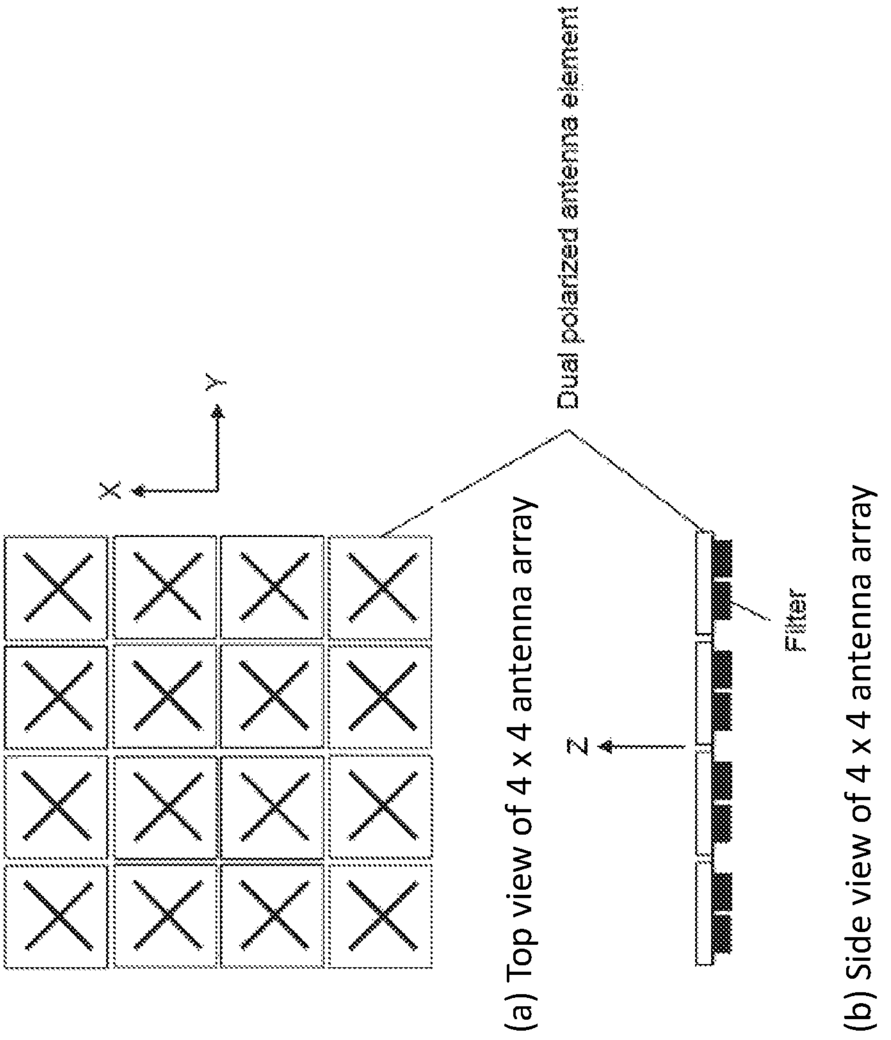
Figure 1. Top and side view of 4 x 4 antenna array

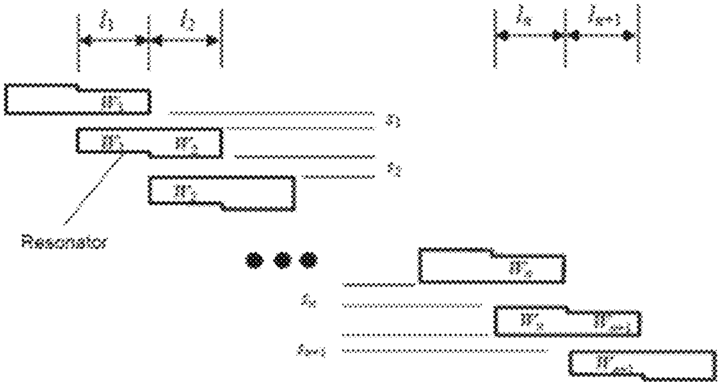
Figure 2. Top view of parallel-coupled half-wavelength resonator filter – prior art.

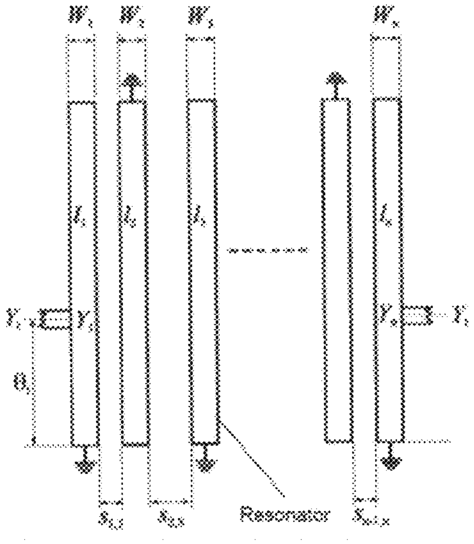
Figure 3. Top view of interdigital parallel-coupled quarter-wavelength resonator filter – prior art.

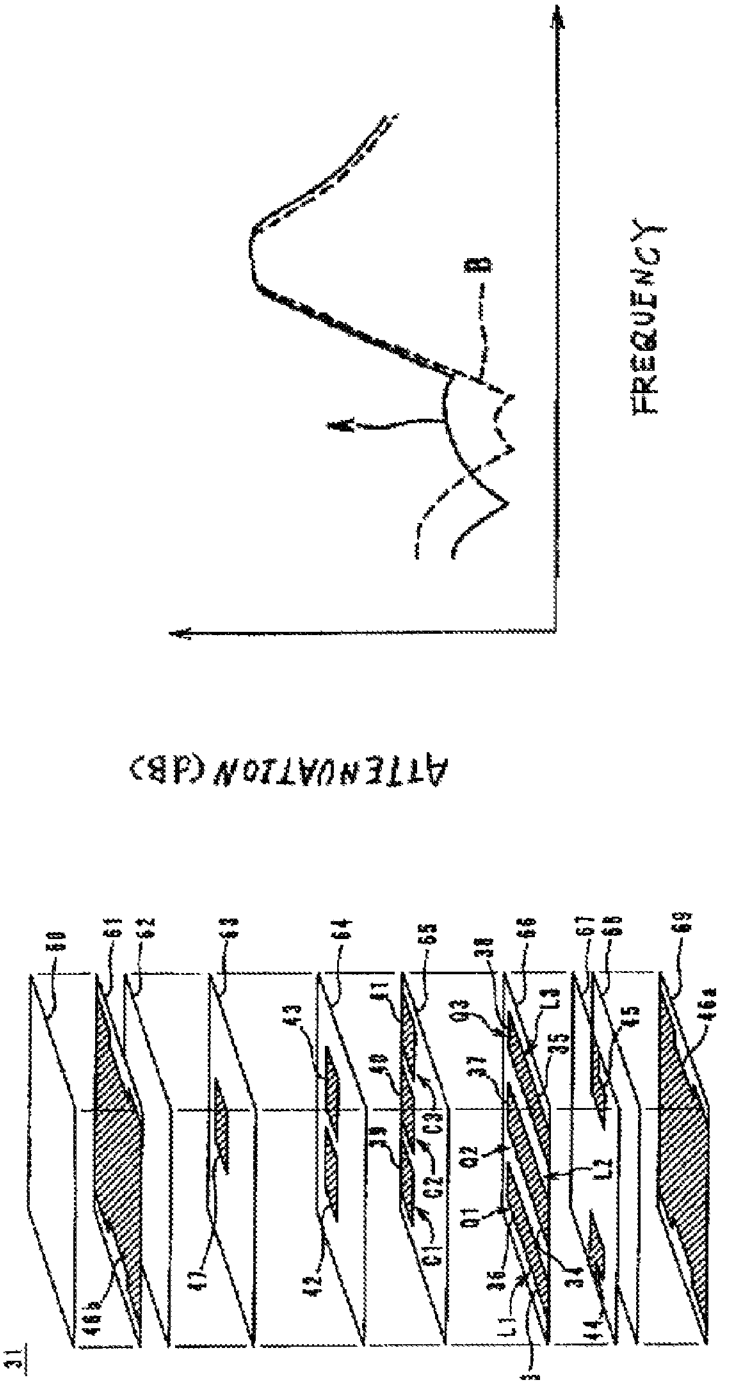
(a)
(b)
Figure 4. 3-pole LC filter with two transmission zeros at lower band of filter passband

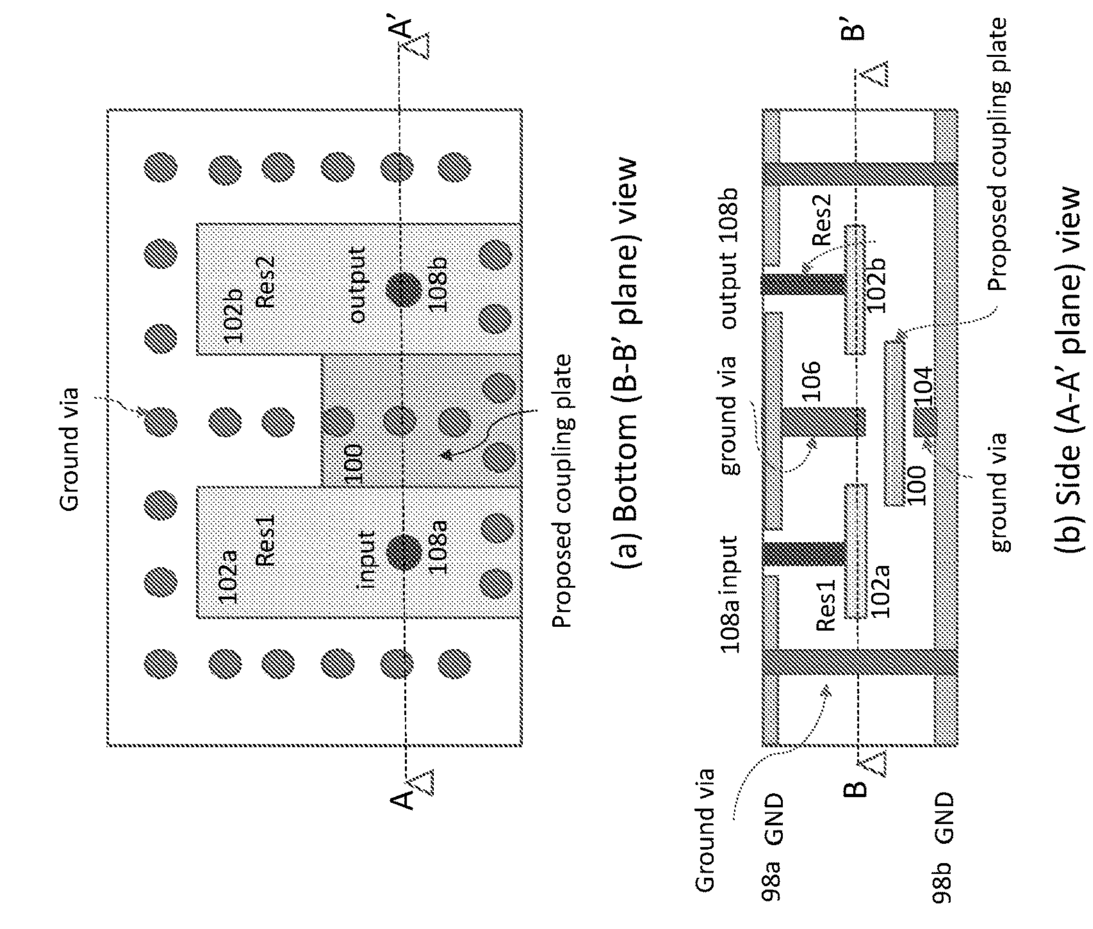
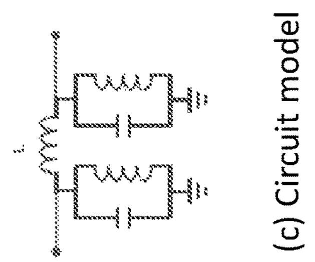
Figure 5. Bottom view and side view of two quarter-wave resonators coupled by a grounded coupling plate, and its circuit model.

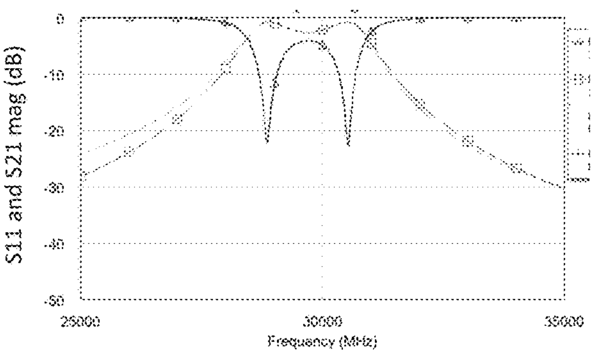
(a). Big coupling plate
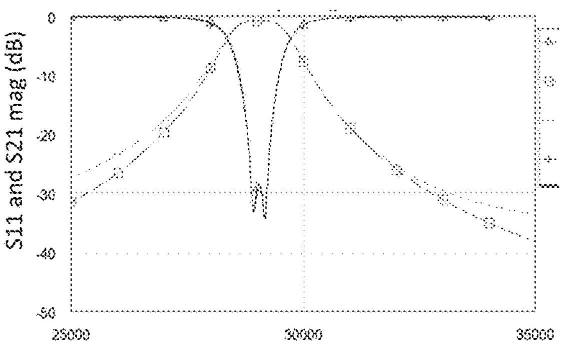
(b). Small coupling plate
Figure 6. S-parameter simulation comparison between HFSS and 2-pole circuit model

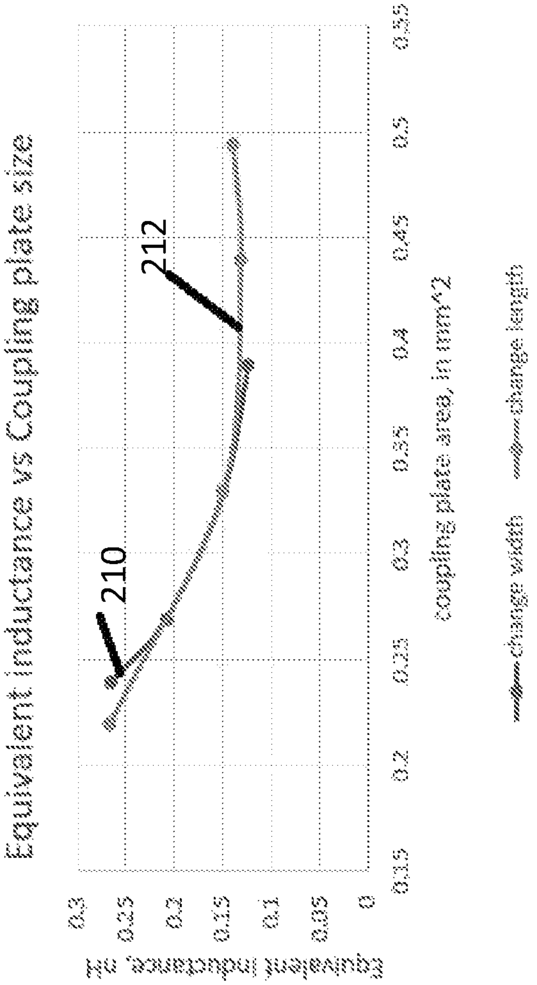
Figure 7. Relationship between coupling plate size and coupling inductance

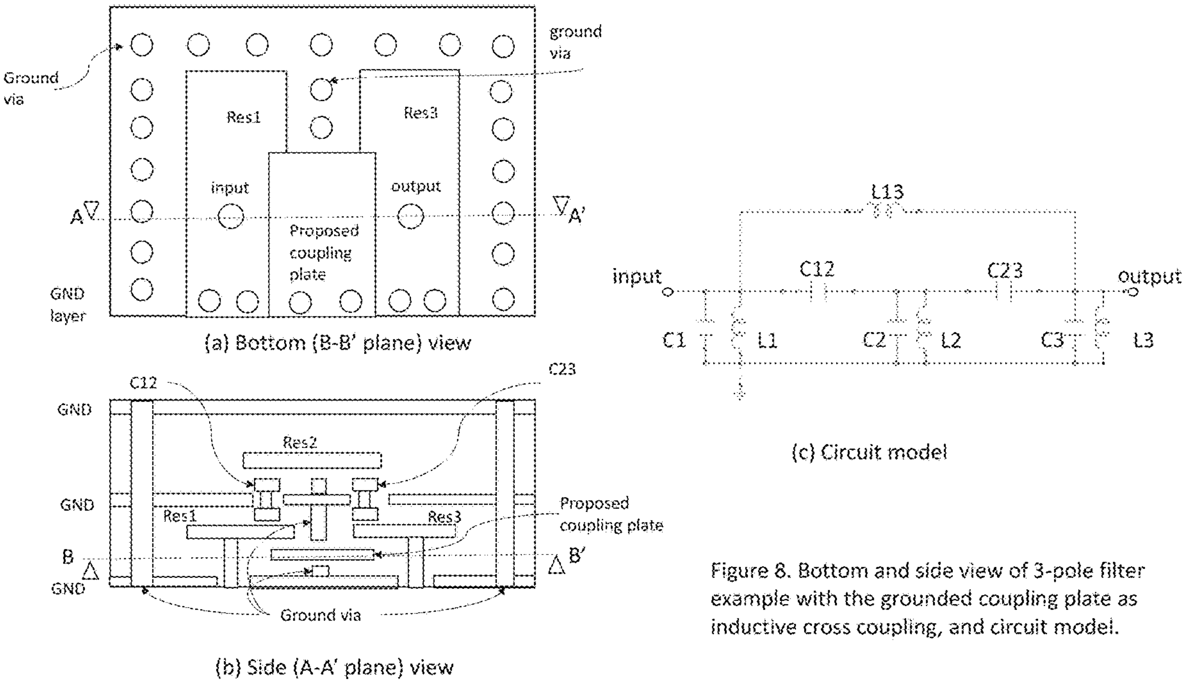
Figure 8. Bottom and side view of 3-pole filter example with the grounded coupling plate as inductive cross coupling, and circuit model.

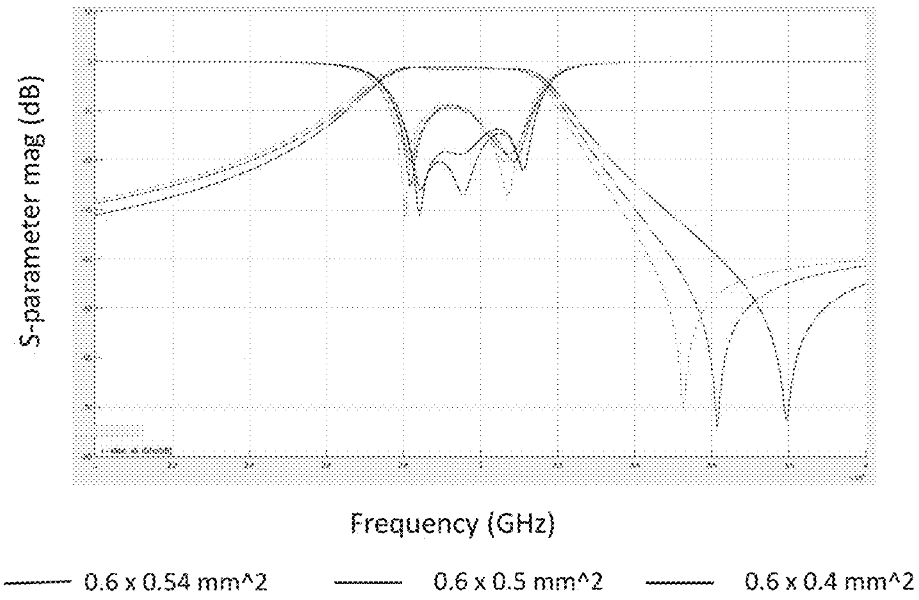
Figure 9. S-parameter from HFSS simulation showing the control of transmission zero by changing grounded plate size

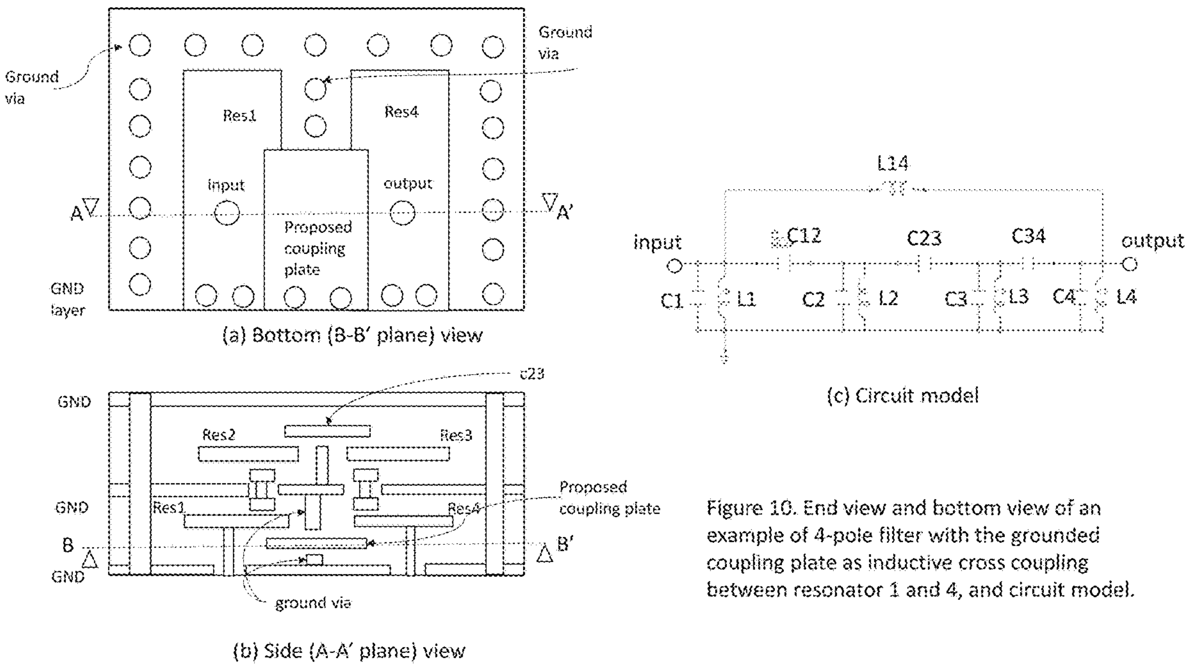
Figure 10. End view and bottom view of an example of 4-pole filter with the grounded coupling plate as inductive cross coupling between resonator 1 and 4, and circuit model.

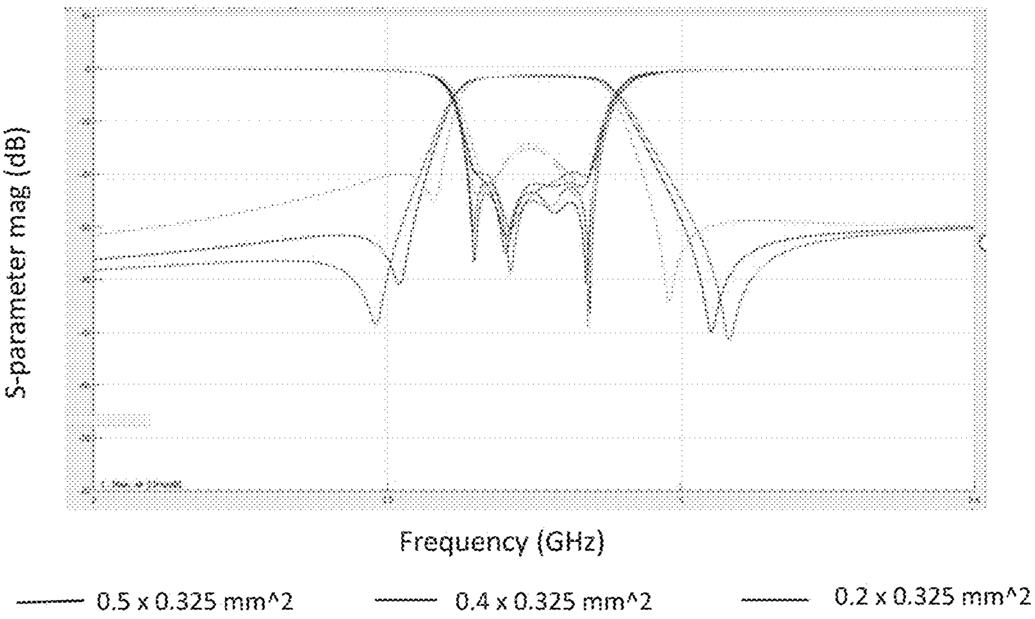
Figure 11. S-parameter from HFSS simulation showing the control of transmission zero by changing grounded plate size

MINIATURE FILTER DESIGN FOR ANTENNA SYSTEMS

FIELD OF INVENTION

The present disclosure relates to wireless communications, and in particular, to filters for radio frequency (RF) front ends in a radio, and more particularly to an inductive coupling arrangement for miniature filter design in Fifth Generation (5G) millimeter (mm) wave applications.

INTRODUCTION

Active Antenna Systems (AAS) with a frequency of operation of 28 Giga Hertz (GHz) or higher require large antenna arrays. Such antenna arrays may be of 32 by 32 elements, or 64 by 64 elements or even higher. FIG. 1 shows an example 4 by 4 antenna array with dual polarized antenna elements. This array has 4 rows of 4 antenna element pairs. At high frequencies, antenna dimensions become very small. For example, at 28 GHz, one antenna element dimension may be about 5 mm by 5 mm. Behind each antenna element is a filter. Therefore, the filters should also be very small, and miniature filters may be desirable, especially in the x-y dimension. Multilayer Low Temperature Co-fired Ceramics (LTCC) and printed circuit board (PCB) filter designs are usually preferred for high frequency operation due to benefits of size and weight. However, high order multilayer LTCC or PCB filters are very lossy in terms of power, i.e., these filters are not efficient from a power standpoint.

Many existing miniature filter designs use parallel capacitive coupled half wavelength strip line resonators, such as shown in FIG. 2. Some more recent miniature filter designs employ quarter wavelength strip line resonators to reduce occupied space in the x-y dimension, such as shown in FIG. 3. However, with parallel-coupled resonator structures, it is difficult to realize transmission zeros in the filter design.

U.S. Pat. No. 6,424,236 to Murata discloses a 3-pole filter design with two transmission zeros on the low side of the filter passband, as shown in FIGS. 4(*a*) and 4(*b*). The three resonators 36, 37 and 38, are parallel-coupled by two capacitive plates 42 and 43 above the resonators. In addition, a capacitive coupling plate 47 above the main coupling plates 42 and 43 is provided to adjust a location of the transmission zeros in the filter design. Since the design of Murata uses parallel-coupled inductive-capacitive (LC) type resonators, the design is large in the x-y dimension, especially with increased filter order. Further, the design of Murata creates zeros only on the low side of the filter passband, without an ability to create zeros on the high side of the filter passband.

Transmission zeros at the low side of a filter passband are relatively easy to implement because capacitance is more easily realized with multi-layer filter designs. In contrast, inductance is harder to realize in multi-layer filter designs, especially inductances in the range to be useful for transmission zero realization. Traditionally, whirl or spiral type structures have been used to design inductors in Radio Frequency Integrated Circuit (RFIC) and multi-layer ceramic filters. However, such structures are quite complicated to construct and are usually very lossy.

SUMMARY

Some embodiments advantageously provide an inductive coupling arrangement for miniature filter design in millimeter (mm) wave applications. In particular, a method to realize inductive coupling between two parallel-coupled resonators is disclosed. This type of inductive coupling is especially suitable for realizing transmission zeros in filter design. In some embodiments, the inductive coupling is realized with a coupling plate, which may be grounded at one end.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 1*a* is an illustration of a top view of a small antenna array with dual polarized elements.

FIG. 1*b* is an illustration of a side view of a small antenna array with dual polarized elements.

FIG. 2 is a top view of a half wavelength resonator filter.

FIG. 3 is a top view of a quarter wavelength resonator filter.

FIG. 4*a* is a diagram of a 3 pole filter with two transmission zeros at a lower band of the filter.

FIG. 4*b* is a diagram of a 3 pole filter with two transmission zeros at a lower band of the filter.

FIG. 5*a* is a bottom view of an example 2 pole filter coupled by a grounded inductive coupling plate.

FIG. 5*b* is a side view of an example 2 pole filter coupled by a grounded inductive coupling plate.

FIG. 5*c* is an equivalent circuit model in accordance with an embodiment of the present disclosure.

FIG. 6*a* is a graph of S parameters for a big inductive coupling plate in accordance with an embodiment of the present disclosure.

FIG. 6*b* is a graph of S parameters for a small inductive coupling plate in accordance with an embodiment of the present disclosure.

FIG. 7 is a graph of inductance variation as a function of coupling plate size.

FIG. 8*a* is a bottom view of a 3 pole filter with grounded inductive coupling plate in accordance with an embodiment of the present disclosure.

FIG. 8*b* is a side view of a 3 pole filter with grounded inductive coupling plate in accordance with an embodiment of the present disclosure.

FIG. 8*c* is an equivalent circuit model in accordance with an embodiment of the present disclosure.

FIG. 9 is a graph of S parameters of the filter of FIG. 8.

FIG. 10*a* is a bottom view of a 4 pole filter with grounded inductive coupling plate in accordance with an embodiment of the present disclosure.

FIG. 10*b* is a side view of a 4 pole filter with grounded inductive coupling plate in accordance with an embodiment of the present disclosure.

FIG. 10 is a bottom view and side view of a 4 pole filter with grounded inductive coupling plate and an equivalent circuit model in accordance with an embodiment of the present disclosure.

FIG. 11 is a graph of S parameters of the filter of FIG. 10.

DETAILED DESCRIPTION

Before describing in detail exemplary embodiments, it is noted that the embodiments reside primarily in combinations of apparatus components and processing steps related to an inductive coupling method for miniature filter design in millimeter (mm) wave applications. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

In embodiments described herein, the joining term, “in communication with” and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term “coupled,” “connected,” and the like, may be used herein to indicate a connection, although not necessarily directly, and may include wired and/or wireless connections.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring again to the drawing figures, in which like elements are referred to by like reference designators, there is shown in FIGS. 5*a* and 5*b* a bottom view and a side view, respectively, of an embodiment of a filter constructed in accordance with the principles of the present disclosure. Positioned between ground planes 98*a* and 98*b* is an inductive coupling plate 100 to provide inductive coupling between two quarter wavelength parallel resonators 102*a* and 102*b*. Compared to traditional capacitive coupling plates, the inductive coupling plate 100 in FIG. 5*a* is grounded at one edge. As a result, when the size of the inductive conducting plate 100 is within a certain range, the conducting plate 100 behaves like an inductance, rather than as a capacitance. This inductance can be modeled by the circuit model shown in FIG. 5*c*. In some embodiments, a ground via 104 extends upward from the ground plane 98*b* and a ground via 106 extends downward from the ground plane 98*a*. The ground plane 98*a* also has two openings, one for an input port 108*a* and one for an output port 108*b*.

FIG. 6 shows S parameters for the filter circuit of FIG. 5 for a larger of two coupling plates (FIG. 6*a*), on the left, and for a smaller of the two coupling plates (FIG. 6*b*), on the right. S11 is the filter input reflection S parameter and S21 is the filter transmission S parameter. S11, shown by curve 204, 205, is high in the stop band and low in the pass band. The opposite is true for S21. Two curves are shown for S11 and S21. One curve 208 is generated from the analysis of the 2-pole circuit model of FIG. 5*c* and the other curve 206 is generated by simulation of the circuit structure of FIGS. 5*a* and 5*b* by a commercial electromagnetic simulation tool called HFSS. These curves show that the inductive coupling plate does indeed behave as an inductance, rather than as a capacitance. FIG. 7 is a graph that shows the inductance variation due to change of coupling plate area by changing plate width (curve 210) and plate length (curve 212).

To illustrate how the proposed inductive coupling plate 100 can be used to provide transmission zeros in the filter function, FIGS. 8 and 9 show an example of a 3 pole filter design with the inductive coupling plate 100 providing inductive cross coupling between the resonator 102*a* and the resonator 102*b*. As in FIG. 5 above, the inductive coupling plate 100 is placed below the layer having the resonators 102*a* and 102*b*. The center line of the inductive coupling plate 100 is aligned with a center line of the gap between the resonators 102*a* and 102*b*. The inductive coupling plate may be broader than or narrower than the gap between the resonators 102*a* and 102*b*. As in FIG. 5, the resonators 102*a* and 102*b* lie between ground planes 98*a* and 98*b*. In addition, there is another ground plane 98*c* and a resonator above the ground plane 98*c*. A first via 104 extends from the ground plane 98*b* toward the inductive coupling plate 100. A second via 106 extends from the ground plane 98*c* toward the inductive coupling plate. Also, input port 108*a* and output port 108*b* are provided through the ground plane 98*b*.

Thus, FIGS. 8*a* and 8*b* show the physical structure of the three pole filter and FIG. 8*c* shows the circuit model of this design. The inductive coupling plate 100 creates a transmission zero on the high side of the filter passband. FIG. 9 shows the HFSS simulation result for three different sizes of the inductive coupling plate 100. As can be seen, there is a transmission zero above the high end of the passband which moves to the right from curve 214 to curve 216 to curve 218 as the size of the inductive coupling plate decreases.

FIGS. 10*a* and 10*b* show a 4 pole filter with the inductive coupling plate 100 providing inductive cross coupling between resonators 102*a* and 102*b*. A difference between the filter of FIG. 8 and the filter of FIG. 10 is the addition of the resonator above the ground plane 98*c*. This configuration creates an additional pole and positions two transmission zeros, one on each side of the filter passband. A circuit model of this 4 pole filter is shown in FIG. 10*c*. FIG. 11 show the S parameters for the filter of FIG. 10, where it can be seen that the inductive coupling plate creates two transmission zeros, one on each side of the pass band, wherein the lower frequency zero moves to the left (curve 220 to curve 222 to curve 224) as the inductive coupling plate size decreases and the higher frequency zero moves to the right (curve 226 to curve 228 to curve 230) as the inductive coupling plate size decreases.

Some embodiments described herein provide ease of creation and control of transmission zeros in high frequency miniature filters by use of a relatively simple inductive coupling plate to inductively cross couple two parallel resonators which may be quarter wavelength resonators, while avoiding more complex designs that use whirl or spiral inductive elements which take up more space and have greater loss.

Thus, some embodiments include an RF filter. In some embodiments, an RF filter includes a plurality of dielectric layers with a first ground plane 98*a* on one side of the dielectric layers and a second ground plane 98*b* on an opposite side of the dielectric layers. One of the first and second ground planes 98*a*, 98*b*, provides an input port 108*a* and one of the first and second ground planes provides an output port 108*b*. Two parallel strip line resonators, 102*a* and 102*b*, lie in a first plane parallel to, and between, the first and second ground planes 98*a* and 98*b*, the two parallel strip line resonators, 102*a* and 102*b*, having a gap there between. A coupling plate 100 in proximity to the gap, is grounded at an edge and lies in a second plane, the second plane parallel to the first plane and lying between the first plane and one of the first and second ground planes, 98*a* and 98*b*. The coupling plate 100 provides inductive coupling between the two parallel strip line resonators 102*a* and 102*b* separated by the gap.

According to this aspect, in some embodiments, the coupling plate 100 has a width and length that affects coupling between resonator 102*a* and 102*b* (FIG. 6), or a location of one transmission zero (FIG. 9) or more transmission zeros (FIG. 11) at a high end of a frequency response of the RF filter. In some embodiments, the RF filter further includes a first ground via 104 perpendicular to and extending toward the coupling plate 100 from a ground plane 98*b* closest to the coupling plate 100. In some embodiments, the RF filter further includes a second ground via 106 perpendicular to and extending toward the coupling plate 100 from a ground plane 98*c* that is not closest to the coupling plate. In some embodiments, each of the two parallel strip line resonators 102*a* and 102*b* are a quarter wavelength in length and grounded at an edge on a same side of the filter as the grounded edge of the coupling plate 100. In some embodiments, each of the two parallel strip line resonators 102*a* and 102*b* is coupled to one of an input port 108*a* and an output port 108*b* of one of the first and second ground planes 98*a* and 98*b*. Note that in some embodiments, the input port and output port may switch roles, the input port 108*a* becoming an output port and the output port 108*b* becoming an input port.

According to another aspect, an array of filters is provided, each filter coupled to a different antenna element of an array of antenna elements. Each filter includes an input/output 108*a*/108*b* port coupled to an antenna element. The filter also includes a first ground plane 98*b* on a side of the filter closest to the antenna element, the input/output port 108*a*/108*b* being coupled to the antenna element through an opening in the first ground plane 98*b*. The filter further includes a second ground plane 98*a* on an opposite side of the filter. Between the first and second ground planes 98*a* and 98*b* is a pair of strip line resonators 102*a* and 102*b* having a gap between the pair, the pair lying in a first plane parallel to and offset from the first and second ground planes 98*a* and 98*b*. An inductive coupling plate 100 lies in a second plane, the second plane being parallel to and lying between the plane of strip line resonators 102*a* and 102*b* and one of the first and second ground plane 98*a* and 98*b*, a center line of the inductive coupling plate 100 being aligned with a center line of the gap between the pair, the inductive coupling plate 100 being grounded at one edge of the filter.

According to this aspect, in some embodiments, the inductive coupling plate 100 has a width and length adjusted to achieve a particular filter response. In some embodiments, a plurality of filters are formed on one of a printed circuit board and a low temperature co-fired ceramic structure. In some embodiments, the filter further comprises a first ground via 104 extending toward the inductive coupling plate 100 from a one of the first and second ground planes 98*b* closest to the second plane. In some embodiments, the filter further comprises a second ground via 106 extending toward the inductive coupling plate 100 from a ground plane 98*c* not closest to the second plane. In some embodiments, each of the two strip line resonators 102*a* and 102*b* are a quarter wavelength in length and grounded at an edge on a same side of the filter as the grounded edge of the inductive coupling plate 100.

Abbreviations that may be used in the preceding description include:

| Abbreviation | Explanation |
|---|---|
| AAS | Active Antenna System |
| LTC | Low temperature Co-fired Ceramics |
| HFSS | a commercially available elctromagnetic simulation tool |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

The invention claimed is:

1. A miniature antenna filter, comprising:
- a plurality of dielectric layers;
- a first ground plane on one side of the plurality of dielectric layers;
- a second ground plane on an opposite side of the plurality of dielectric layers and parallel to the first ground plane;
- one of the first and second ground planes providing an input port and one of the first and second ground planes providing an output port;
- two parallel strip line resonators lying in a first plane parallel to, and between, the first and second ground planes, the two parallel strip line resonators having a gap there between; and
- a coupling plate in proximity to the gap, grounded at an edge and lying in a second plane, the second plane parallel to the first plane and lying between the first plane and one of the first and second ground planes, the coupling plate providing inductive coupling between the two parallel strip line resonators separated by the gap.

2. The miniature antenna filter of claim 1, wherein the coupling plate has a width and length that affect coupling between the two parallel strip line resonators and a location of one or more transmission zeros at a high end of a frequency response of the RF filter.

3. The miniature antenna filter of claim 1, further comprising a first ground via perpendicular to and extending toward the coupling plate from a ground plane closest to the coupling plate.

4. The miniature antenna filter of claim 3, further comprising a second ground via perpendicular to and extending toward the coupling plate from a ground plane that is not closest to the coupling plate.

5. The miniature antenna filter of claim 1, wherein each of the two parallel strip line resonators are a quarter wavelength in length and grounded at an edge on a same side of the filter as the grounded edge of the coupling plate.

6. The miniature antenna filter of claim 1, wherein each of the two parallel strip line resonators is coupled to one of an input port and an output port of one of the first and second ground planes.

7. An array of filters, each filter couplable to a different antenna element of an array of antenna elements, each filter comprising:

an input/output port coupled to an antenna element of the array of antenna elements;

a first ground plane on a side of the filter closest to the antenna element, the input/output port being coupled to the antenna element through an opening in the first ground plane;

a second ground plane on an opposite side of the filter; and between the first and second ground planes:

a pair of strip line resonators having a gap between the pair, the pair of strip line resonators lying in a first plane parallel to and offset from the first and second ground planes; and an inductive coupling plate lying in a second plane, the second plane being parallel to and lying between the plane of strip line resonators and one of the first and second ground plane, a center line of the inductive coupling plate being aligned with a center line of the gap between the pair, the inductive coupling plate being grounded at one edge of the filter.

8. The array of filters of claim 7, wherein the inductive coupling plate has a width and length arranged to achieve a particular filter response.

9. The array of filters of claim 7, wherein a plurality of filters are formed on one of a printed circuit board and a low temperature co-fired ceramic structure.

10. The array of filters of claim 7, wherein the filter further comprises a first ground via extending toward the inductive coupling plate from a one of the first and second ground planes closest to the second plane.

11. The array of filters of claim 10, wherein the filter further comprises a second ground via extending toward the inductive coupling plate from a ground plane not closest to the second plane.

12. The array of filters of claim 7, wherein each of the two strip line resonators of strip line resonators are a quarter wavelength in length and grounded at an edge on a same side of the filter as the grounded edge of the inductive coupling plate.

* * * * *